(12) United States Patent
Hoffmann (10) Patent No.: US 10,578,077 B2
(45) Date of Patent: Mar. 3, 2020

(54) ROTOR BLADE FOR A WIND TURBINE

(71) Applicant: WOBBEN PROPERTIES GMBH, Aurich (DE)

(72) Inventor: Alexander Hoffmann, Emden (DE)

(73) Assignee: Wobben Properties GmbH, Aurich (DE)

( * ) Notice: Subject to any disclaimer, the term of this patent is extended or adjusted under 35 U.S.C. 154(b) by 436 days.

(21) Appl. No.: 15/302,960

(22) PCT Filed: Mar. 31, 2015

(86) PCT No.: PCT/EP2015/057116
§ 371 (c)(1),
(2) Date: Oct. 7, 2016

(87) PCT Pub. No.: WO2015/155079
PCT Pub. Date: Oct. 15, 2015

(65) Prior Publication Data
US 2017/0022969 A1 Jan. 26, 2017

(30) Foreign Application Priority Data

Apr. 7, 2014 (DE) .......................... 10 2014 206 670
Apr. 9, 2014 (DE) .......................... 10 2014 206 887

(51) Int. Cl.
*F03D 1/06* (2006.01)
(52) U.S. Cl.
CPC ...... *F03D 1/0675* (2013.01); *F05B 2220/706* (2013.01); *F05B 2240/302* (2013.01);
(Continued)

(58) Field of Classification Search
CPC .. F03D 13/40; F03D 1/0675; F05B 2220/706; F05B 2240/302;
(Continued)

(56) References Cited

U.S. PATENT DOCUMENTS 4,169,749 A * 10/1979 Clark .................. B29C 33/0016
156/156
6,371,730 B1 4/2002 Wobben
(Continued)

FOREIGN PATENT DOCUMENTS

DE 943880 6/1956
DE 3109566 A1 10/1982
(Continued)

OTHER PUBLICATIONS

Machine Translation of WO 2013083451 [retrieved on Dec. 26, 2018]. Retrieved from: Espacenet.*

*Primary Examiner* — Kenneth J Hansen
*Assistant Examiner* — Eric J Zamora Alvarez
(74) *Attorney, Agent, or Firm* — Seed Intellectual Property Law Group LLP (57) ABSTRACT

A rotor blade for a wind turbine comprising a blade root to be fastened to a rotor hub, a blade tip opposite the blade root, a rotor blade longitudinal axis extending from the blade root to the blade tip, an inner rotor blade part on the near side of the blade hub, especially encompassing the blade root, and an outer blade part on the far side of the blade hub, especially encompassing the blade tip. The inner rotor blade part and the outer rotor blade part are joined to one another in a joining zone which forms a bulge in the rotor blade.

20 Claims, 7 Drawing Sheets

(52) U.S. Cl.
CPC . *F05B 2260/301* (2013.01); *F05B 2280/6003* (2013.01); *Y02E 10/721* (2013.01); *Y02E 10/725* (2013.01)

(58) Field of Classification Search
CPC ....... F05B 2260/301; F05B 2280/6003; Y02E 10/721; Y02E 10/725
See application file for complete search history.

(56) References Cited

U.S. PATENT DOCUMENTS

| | | | |
|---|---|---|---|
| 6,942,461 B2 * | 9/2005 | Wobben | F03D 1/0658 416/210 R |
| 7,891,947 B2 * | 2/2011 | Chen | F03D 1/0675 416/225 |
| 7,980,827 B2 | 7/2011 | Stiesdal | |
| 8,142,157 B2 * | 3/2012 | Kita | F03D 1/0675 416/146 R |
| 8,192,170 B2 * | 6/2012 | Rohden | F03D 1/0675 416/230 |
| 8,348,622 B2 | 1/2013 | Bech | |
| 8,376,713 B2 | 2/2013 | Kawasetsu et al. | |
| 8,510,947 B2 | 8/2013 | Kirkpatrick et al. | |
| 8,777,573 B2 | 7/2014 | Hibbard et al. | |
| 2009/0226320 A1 * | 9/2009 | Torres Martinez | F03D 1/0675 416/204 R |
| 2010/0122442 A1 * | 5/2010 | Kirkpatrick | B23P 15/04 29/233 |
| 2011/0091326 A1 | 4/2011 | Hancock | |
| 2011/0243736 A1 | 10/2011 | Bell | |
| 2011/0293432 A1 | 12/2011 | Hibbard et al. | |
| 2012/0141287 A1 | 6/2012 | Hynum et al. | |
| 2014/0178205 A1 * | 6/2014 | Nanukuttan | B23P 11/00 416/241 R |
| 2014/0334934 A1 | 11/2014 | Kannenberg et al. | |
| 2014/0356176 A1 * | 12/2014 | Caruso | F03D 1/0658 416/219 R |
| 2015/0226180 A1 * | 8/2015 | Grove-Nielsen | F03D 1/0658 416/217 |

FOREIGN PATENT DOCUMENTS

| | | |
|---|---|---|
| DE | 19733372 C1 | 1/1999 |
| DE | 19962989 B4 | 4/2006 |
| DE | 102006022279 A1 | 11/2007 |
| DE | 102006014742 B4 | 1/2008 |
| DE | 202011101634 U1 | 9/2011 |
| DE | 102011088025 A1 | 6/2013 |
| EP | 1398499 A1 | 3/2004 |
| EP | 1798412 A2 | 6/2007 |
| EP | 1950414 A2 | 7/2008 |
| EP | 1956235 A1 | 8/2008 |
| ES | 2333499 | 2/2010 |
| FR | 1187166 A | 9/1959 |
| JP | 2004011616 A | 1/2004 |
| JP | 2008180102 A | 8/2008 |
| RU | 2002106 C1 | 10/1993 |
| RU | 2392486 C1 | 6/2010 |
| WO | 0142647 A2 | 6/2001 |
| WO | 2006002621 A1 | 1/2006 |
| WO | 2006056584 A1 | 6/2006 |
| WO | 2007131937 A1 | 11/2007 |
| WO | 2010086297 A2 | 8/2010 |
| WO | 2013075718 A1 | 5/2013 |
| WO | 2013083451 A1 | 6/2013 |

* cited by examiner

ROTOR BLADE FOR A WIND TURBINE

BACKGROUND

Technical Field

The present disclosure relates to a wind turbine rotor blade and to a wind turbine having such a rotor blade. The present disclosure moreover relates to a method for producing a wind turbine rotor blade.

Description of the Related Art

Wind turbines are known and the currently most common type of wind turbine is a so-called horizontal-axis wind turbine, usually having three rotor blades. The dimensions of such wind turbines are getting bigger and bigger, namely in particular they have a higher hub or axis height and a larger rotor diameter with a correspondingly larger generator and greater feed-in power. Larger rotor diameters mean larger rotor blades which need to be transported from where they are manufactured to the respective site of erection. In particular the need to transport such long rotor blades, which can now have lengths as great as approximately 60 meters, regularly makes it necessary to use multi-part rotor blades.

Such multi-part rotor blades, which have at least two parts in the longitudinal axis, are known. For example, a type E-126 ENERCON wind turbine uses a rotor blade with a steel part close to the hub and a GFRP part remote from the hub. The structure is shown, for example, in U.S. Pat. No. 8,192,170.

The use of multi-part rotor blades can make transport easier. There is furthermore a growing desire to construct rotor blades that are as light and thin as possible so as thereby to save costs, to be precise not only the costs of the blade but also the cost of the subsequent support structures of the wind turbine and also the cost of erecting the wind turbine. In this sense, rotor blades are today being increasingly optimized, wherein a particularly good aerodynamic design is of course also important and needs to be taken into account when constructing a rotor blade.

WO2013/083451 shows an alternative of an assembled rotor blade consisting of a part close to the hub and a part remote from the hub, both parts being made substantially of GFRP. This example shows a very efficient solution for connecting the two rotor blade parts. Multiple connecting bolts are arranged in a peripheral row in the rotor blade, can be accessed there and in particular tightened and even prevent fatigue by virtue of pretensioining. This solution provides a particularly strong peripheral region at the connecting point of the two rotor blade parts, in which this connecting and bolting together is carried out by means of the said bolts. This shown connecting region which receives the multiple bolts must correspondingly absorb the entire load of the outer blade part, i.e., the one close to the hub. Both the corresponding connecting region at the rotor blade part close to the hub and the corresponding connecting region at the part of the rotor blade remote from the hub in practice have to absorb these forces completely and reliably. The force or load which occurs on these connecting regions also has to be introduced correspondingly into the respective part, i.e., the part of the rotor blade which is close to the hub or remote from the hub, respectively. The loads which need to be introduced can be considerable, which can sometimes also affect durability and at least be a potential point of weakness. The German Patent and Trademark Office has conducted a search as part of the priority application for the present application and found the following prior art: US 2011/0293432 A1, WO 01/42647 A2, WO 2006/ 002 621 A1, WO 2006/ 056 584 A1.

BRIEF SUMMARY

One or more embodiments are directed to a rotor blade having a blade root for fastening to a rotor hub, and a blade tip. The blade tip is at the end of the rotor blade which is averted from the rotor hub, in other words radially to the outside relative to the rotor. A rotor blade longitudinal axis extends from the blade root to the blade tip.

The rotor blade is multi-part and has a rotor blade inner part and a rotor blade outer part. The rotor blade inner part faces the blade hub, and can therefore be referred to as the blade part close to the hub, and comprises in particular the blade root. Correspondingly, the rotor blade outer part is averted from the blade hub, and can therefore be referred to as the blade part remote from the hub, and it comprises in particular the blade tip. The terms inner and outer relate here to the rotor and a radial direction. Inner, in other words radially inner, is towards the axis of rotation and outer, or radially outer, is to the outside relative to the axis of rotation. The rotor blade is preferably composed of only two parts, viewed in the longitudinal direction, to be precise of the rotor blade inner part which then has the rotor blade root, and of the rotor blade outer part which then has the rotor blade tip. Alternatively, however, the rotor blade tip can also, for example, form a separate part, but this is not the case here. As is also explained further below, other elements can also be present on the rotor blade or the rotor blade can be divided into further elements but these are preferably not further divided in the longitudinal direction.

It is now proposed that the rotor blade inner part and the rotor blade outer part are connected to each other in a connecting region, and the connecting region forms a thickened portion in the rotor blade. The surface of the rotor blade is then therefore, not completely continuously from the blade root to the blade tip, a more or less straight but if need be slightly curved surface and instead has a markedly thickened portion in the connecting region. This thickened portion is essentially designed as a type of completely or partially peripheral web or wall.

It preferably extends in a plane along the connecting region and hence transversely to the rotor blade longitudinal axis. It extends at least from high-pressure side to the low-pressure side and vice versa, in other words over the leading edge of the rotor blade. The trailing edge of the rotor blade is usually designed to be extremely sharp, at any rate in comparison with the leading edge of the rotor blade, and although the thickened portion can extend as far as there, it does not extend around this edge, at any rate not preferably. This thickened portion and this peripheral or partially peripheral web can have a beveled region so that it merges via this angled region with the remaining rotor blade surface of the corresponding side. For example, the surface of the rotor blade therefore extends, starting from the blade root and moving radially outwards, initially flat or if need be slightly curved, then meets this beveled region and rises correspondingly as far as the thickest or highest region of the thickened portion which likewise can have a certain width such as, for example, 10 to 30 cm or the like. The surface then runs down the slope to the essentially no longer thickened blade surface and extends from there in an essentially familiar fashion as far as the rotor blade tip.

By virtue of this thickened portion it is now possible to produce a stable connection between the two blade parts, in other words the rotor blade inner part and the rotor blade outer part. It has been shown that this solution has very good aerodynamic properties. The thickened portion extends namely parallel to the expected airflows when the rotor blade is in operation. Because this thickened portion is arranged parallel to these airflows, it not only does not have a negative effect on the aerodynamics and these airflows but even has a positive effect. The situation can namely be facilitated by the airflows or any turbulence not drifting along the rotor blade, i.e., from the rotor blade hub to the rotor blade tip or vice versa. Instead a flow which is as laminar as possible and parallel is facilitated.

At the same time it was also recognized that this thickened portion is advantageous despite a general desire to design rotor blades which are as thin as possible. However, the thickened portion does not change the aerodynamics and can, as described, on the contrary act as a boundary layer fence. Moreover, although a rotor blade which had the dimensions in the region of the thickened portion over its entirety would be too heavy, or at least undesirably heavy, the weight does not play a role in this connecting region. This is not only because the region is small relative to the total length of the rotor blade but also because the fastening between these two blade parts is thickened and hence shifted outwards, which creates better leverage ratios for the fastening and as a result can even be realized with less, or at least comparatively less material.

Lastly, it was also recognized that a part of the fastening can take place in this thickened portion without there being any need for access from outside. This outward thickening is also helpful despite the fastening, in particular using screws, taking place on the inside.

The connection between the rotor blade inner part and rotor blade outer part is preferably effected in the connecting region using screws and/or bolts.

A solid connection can be achieved hereby and if necessary also tightened up at maintenance intervals.

The thickened portion preferably rises by at least 1cm, in particular by at least 2 cm, above the blade surface. Moreover or alternatively, the thickened portion thickens the rotor blade by at least one percent, in particular by at least two percent, relative to the profile depth or chord length in the connecting region.

Moreover or alternatively, such a completely or partially peripheral thickened portion has an essentially constant width of 100 to 200 cm, in particular approximately 1.5 m. The desired stability and at the same time a boundary layer fence-type effect can be achieved hereby.

An embodiment proposes that the rotor blade outer part is composed of an outer core and outer trailing edge box, and that the rotor blade inner part is correspondingly composed of an inner core and inner trailing edge box. Here too the terms outer and inner relate to the radial direction of the rotor, in other words the direction of the axis of rotation, towards the outside or inside respectively with respect to the axis of rotation. The rotor blade outer part and the rotor blade inner part are assembled in the region of the outer and inner core. The connecting means such as screws or bolts or the like are provided there. The outer and inner trailing edge boxes are then each attached only at their corresponding outer and inner core. The outer and inner trailing edge boxes are thus not, or not substantially, fastened to each other.

The rotor blade and correspondingly the rotor blade outer part and the rotor blade inner part correspondingly have the thickened portion in the region of the outer and inner core, namely at the point where they are assembled. However, the thickened portion moreover extends at least partially from the outer and inner core, respectively, to the outer and inner trailing edge box, respectively, in order thereby to influence the aerodynamics positively.

The inner and outer core can each take the form of a wound core and/or have an oval shape in cross-section. Providing a wound core means that the core is produced from wound layers, in particular that fiber materials, in particular fiber mats made of glass fiber or carbon fiber, are wound to produce the core in order thereby to produce a core of fiber-reinforced plastic. A particularly stable core can be produced as a result. An oval shape can make allowance for the forces which occur and be adapted successfully to the rotor blade which is to be produced. The oval shape also allows production by winding for a non-circular shape and an advantageous force distribution can be achieved. Nevertheless, the oval shape should not be selected to be too thin in order to be able ensure good stability in multiple directions. For this purpose, a ratio between the smallest and largest diameter of the oval of 1:1.2 to 1:2 is proposed, in particular from 1:1.4 to 1:1.7, in particular a ratio of approximately 1:1.5. Furthermore, a cross-section here refers to a cross-section transverse to the longitudinal axis of the rotor blade.

Fastening means are preferably enclosed in laminate in the region of the thickened portion. Openings, passages and anchors or sockets for anchors are in particular provided already fixed or enclosed in laminate during the production of these elements. For example, multiple anchoring elements can be enclosed in laminate in the rotor blade outer part in the connecting region, in particular around the periphery. In addition or alternatively, fixtures and passages for screws or threaded bolts can be provided in the rotor blade inner part in the connecting region for connection to the anchoring elements. Uniform edges, bearing surfaces or the like can also be provided in the rotor blade inner part in order to receive fastening or connecting fixtures, to mention just a few examples. Likewise, the functionality of the rotor blade outer part and rotor blade inner part can also be swapped so that the anchoring elements can therefore be arranged in the rotor blade inner part and the said passages or supporting edges can be arranged in the rotor blade outer part. Alternatively, however, these same passages, namely bores and sockets for anchoring elements, can be introduced subsequently, in particular can be bored. A clean supporting edge, bores, slots or the like can also be milled at a later point in time.

A fiber-reinforced plastic, in particular GFRP or CFRP, is correspondingly provided as essential material for the rotor blade outer part and the rotor blade inner part. These two rotor parts can of course have other materials but the essential material, in particular the material which gives them their profile, in particular the outer sleeve which defines the profile and to a large extent provides the stability, is manufactured from this material. The elements which are required in the connecting region for connection purposes, such as anchoring elements, pins and bolts, can, however, be manufactured from a different material, in particular from steel or another type of iron.

An outer and an inner row of threaded rods are preferably provided in order to fasten the rotor blade parts to each other. The terms outer and inner hereby refer to the rotor blade such that the outer row extends continuously essentially directly below the surface of the blade, whereas the inner row extends continuously inside this outer row, i.e., closer to the center axis of the rotor blade. Good fastening of the two blade parts to each other can be achieved as a result. Moreover, the forces which occur can be better spread by this design with two rows.

A threaded rod from the inner row and one from the outer row preferably in each case together form a pair of threaded rods which in turn are part of a fastening pair. Such a pair of threaded rods moreover has a common inner anchoring pin which extends transversely to the threaded rods and is anchored in the rotor blade inner part, and a common outer anchoring pin which likewise extends transversely to the threaded rods. The terms outer and inner here refer to the rotor blade parts so that the inner anchoring pin is thus anchored, namely inserted, in the rotor blade inner part and the outer anchoring pin is correspondingly anchored, i.e., inserted, in the outer rotor blade part. These anchoring pins here point essentially radially outwards with respect to the rotor blade surface, viewed from a rotor blade center axis.

A corresponding connecting force can thus hereby be exerted between the two rotor blade parts by two anchoring pins which are used by two threaded rods. The two threaded rods essentially extend next to each other through these two anchoring pins and the anchoring pins have a corresponding length and thickness in order to be able to receive the threaded rods, in order to allow their force to absorbed by them and transmitted into the blade.

According to an advantageous embodiment, one of the two anchoring pins is inserted essentially rigidly in a bore, the size of which, in particular the diameter, is adapted to that of the anchoring pin, the other fastening pin being arranged in an elongated opening which, in particular in plan view, is similar to or is a slot. Clamping means for the threaded rods can be provided in the region of this pin, which is arranged in the elongated opening, so that the threaded rods can be clamped herewith.

The outer row of threaded rods, or a single row of threaded rods, is preferably arranged in the region below the thickened portion so that the thickened portion covers this row of threaded rods, in particular such that, in the absence of this thickened portion, this row of threaded rods would lie outside the rotor blade, or at least would be flush with or project from the rotor blade surface.

A very good connection can thus be achieved between the two rotor blade parts, wherein at the same time advantageous aerodynamic properties can occur.

An embodiment proposes that the threaded rods, in particular all of the threaded rods or all of the outer row, have a slight inclination with respect to the outer blade surface. Such an inclination means a range which in particular extends from 0.5 to 5 degrees, in particular is approximately 1 degree. As a result, the threaded rods and hence in particular the fastening pairs can advantageously be arranged such that the direction of the forces is particularly favorable and can be introduced particularly favorably into the blade parts and also such that access to the clamping means can be improved.

Multiple fastening pairs are preferably provided and these have an inner anchoring pin, an outer anchoring pin and two threaded rods which are in each case provided with an expansion sleeve and a clamping means. The clamping means can in particular be a clamping nut, wherein the two anchoring pins are preferably arranged between the expansion sleeve, on the one hand, and the clamping means, on the other hand. The design is then such that initially a clamping sleeve is provided for each threaded rod and is attached to one of the two fastening pins. The threaded rod then extends from one rotor blade part, which can be the outer or inner part, to the other rotor blade part in which the other anchoring pin is then provided through which the threaded rod extends. Lastly, a clamping means is finally arranged on the threaded rod, in particular a clamping nut which can then be screwed against the anchoring pin in order thereby to pull the two anchoring pins towards each other and thus also pretension the expansion sleeve. It can thus be achieved that the clamping means engages directly with the threaded rod and an anchoring pin and yet an expansion sleeve is provided and can hold the pretension.

According to an embodiment, the rotor blade is constructed such that the threaded rod, i.e., in particular each threaded rod, cannot, in the assembled state of the rotor blade, be removed but can be clamped. In particular the threaded rod is at least 40 cm long, preferably approximately 80 cm long. As a result, a corresponding gap can be achieved between the two anchoring bolts so that a lot of substance remains in the rotor blade to absorb the necessary forces. Moreover, it is also possible to provide a correspondingly long expansion sleeve when there is a long threaded rod. It has been proved that it is no longer necessary to remove such threaded rods after mounting and instead even the loss of threaded rods can be avoided.

The two blade parts, i.e., the rotor blade inner part and the rotor blade outer part, are then connected such that a part of the fastening pair, in particular in each case an anchoring pin with two threaded rods and two expansion sleeves, can be already provided, in particular premounted, in one of the two blade parts, in other words for example the rotor blade outer part. Because the threaded rod in each case already sits in an expansion sleeve and additionally in an anchoring pin, it has a very clearly defined position and orientation. Preinstallation is thus readily possible.

By virtue of this preinstallation, the two rotor blade parts can now be assembled such that the two threaded rods of each fastening pair each project into an elongated opening or recess which is similar to a slot. In succession, the other fastening pin can now be placed there first and then the clamping means, in particular clamping nuts, are arranged and lastly clamped as well. A fastening pair is moreover proposed, as has already been explained in at least one embodiment above in connection with the two-part rotor blade.

A wind turbine is moreover proposed which has at least one rotor blade according to one of the above-described embodiments. The wind turbine can thus profit from the benefits of these rotor blades and be installed relatively cost-effectively as the rotor blades are supplied in two parts.

A method for producing a rotor blade of a wind turbine is moreover proposed. This method comprises at least the step of producing a rotor blade inner part and producing a rotor blade outer part, including a connecting region with a thickened portion, and the method comprises the step of connecting the rotor blade inner part to the rotor blade outer part at an erection site of a wind turbine. The disclosure can thus advantageously be used to produce a rotor blade and as a result construct a wind turbine.

During production, a barrier plate or barrier disc can be provided in the connecting region between the rotor blade outer part and rotor blade inner part relative to which the rotor blade longitudinal axis thus extends essentially perpendicularly. This barrier plate or barrier disc is here preferably dimensioned such that it projects above the thickened portion in the manner of a boundary layer fence. A boundary layer fence can thus be provided in a simple fashion.

A method for producing a rotor blade of a wind turbine is moreover proposed, wherein in particular a rotor blade is produced as was described in at least one of the preceding embodiments. It is correspondingly also proposed that, before the rotor blade inner part is assembled with the rotor blade outer part, threaded rods are used for connection in one of the two rotor blade parts, in particular are in this respect used or premounted in each case together with an expansion sleeve.

BRIEF DESCRIPTION OF THE SEVERAL VIEWS OF THE DRAWINGS

The disclosure is now explained in detail below with the aid of exemplary embodiments by way of example with reference to the attached drawings, in which.

DETAILED DESCRIPTION

Figure 1:
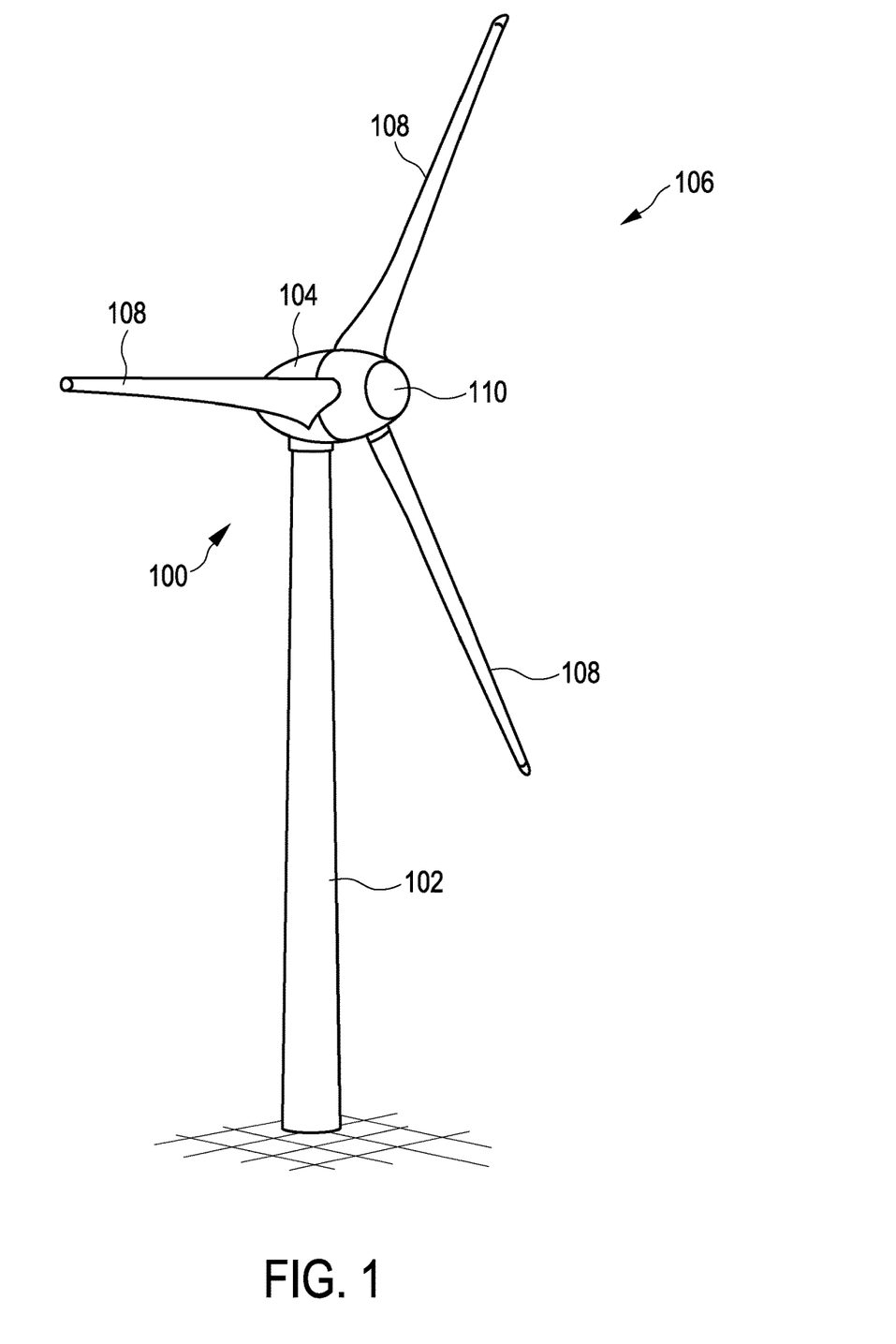
FIG. 1 shows a wind turbine in a perspective view.

FIG. 1 shows a wind turbine 100 with a tower 102 and a nacelle 104. A rotor 106 with three rotor blades 108 and a spinner 110 is arranged on the nacelle 104. The rotor 106 is set in rotational motion by the wind and as a result drives a generator in the nacelle 104.

Figure 2:
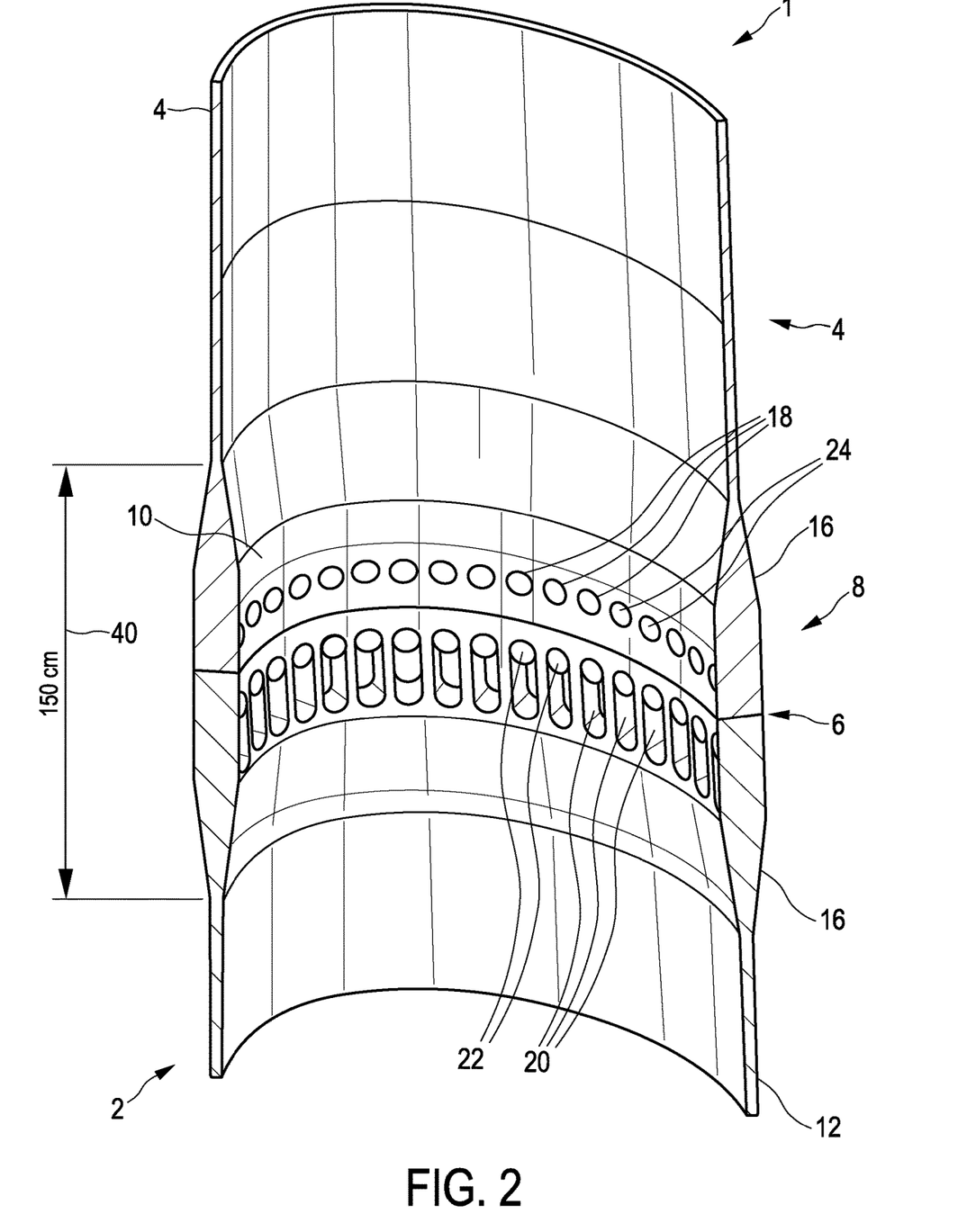
FIG. 2 shows a portion of a connecting region of a rotor blade in which a rotor blade outer part and a rotor blade inner part are connected to each other.

FIG. 2 shows a portion of a rotor blade 1 with a rotor blade inner part 2 and a rotor blade outer part 4. The drawing also shows the division of the section of the rotor blade 1 shown into multiple more or less rectangular areas, which serves for the computational splitting-up into regions with the same material coordinate systems but does not need to be explained in more detail here.

Apart from that, the rotor blade inner part 2 and the rotor blade outer part 4, which can also be referred to more simply as the inner blade 2 and the outer blade 4 respectively, are connected to each other in the region of a joint 6. A separating disc or the like could also be arranged in this region as a boundary layer fence.

FIG. 2 shows, in the region in the joint, a thickened portion 8 in which the blade wall 12 of the inner blade 2, or 14 of the outer blade 4, projects far beyond this thickened portion 8. In this respect this thickened portion 8 forms a peripheral web or wall which has beveled regions 16 on both sides.

A thickened portion 10 is also provided correspondingly on the inside. Both thickened portions 8 and 10 are produced by the application of material, here namely by laminating on GFRP. The advantageous thickened portion can thus also absorb compressive and tensile forces and consequently strengthen the rotor blade 1, in particular in the region of the joint 6. The width of the thickened portion 8 applied here is approximately 150 cm, taking into account the beveling of the thickened portion, namely of the material applied. The thickened or beveled portion has a width of approximately 1 meter. The blade walls 2 and 4 can, for their part, also have a slight taper, i.e., an inclination taper towards the thickened portion, but this is not part of the thickened portion.

The whole thickened portion including the bevel 16 runs around the periphery for the part of the rotor blade 1 shown and here has a constant width. This applies to the region without the beveled region 16 and to the region with it.

Bores 18 and elongated openings 20 for anchoring bolts are shown in FIG. 2, which essentially shows a view inside the cutaway rotor blade 1. Outer anchoring pins 24 are arranged in the bores 18 and inner anchoring pins 22 are arranged in the elongated openings 20. The reverse could also occur.

Figure 3:
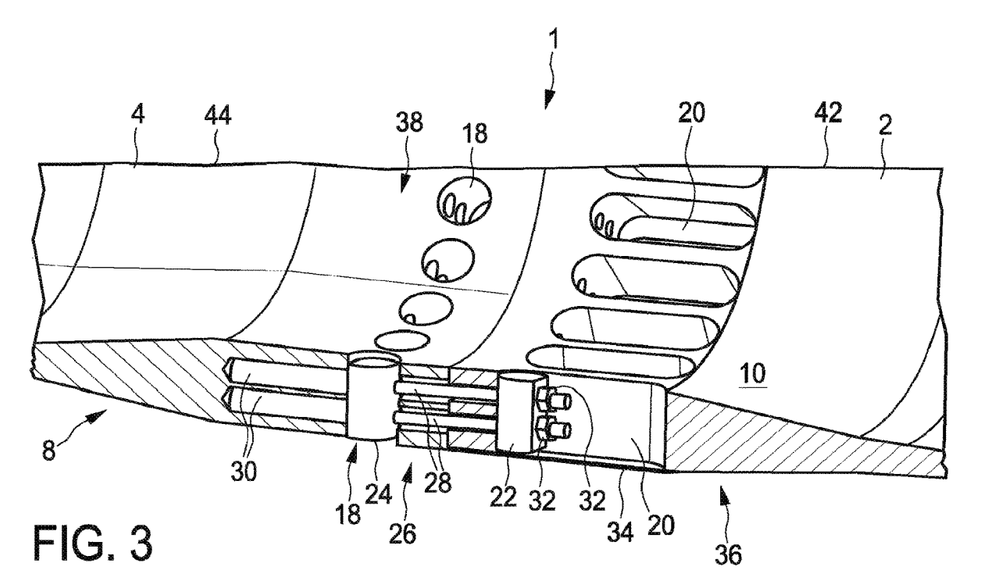
FIG. 3 shows a perspective portion of the connecting region according to FIG. 2.
Figure 4A:
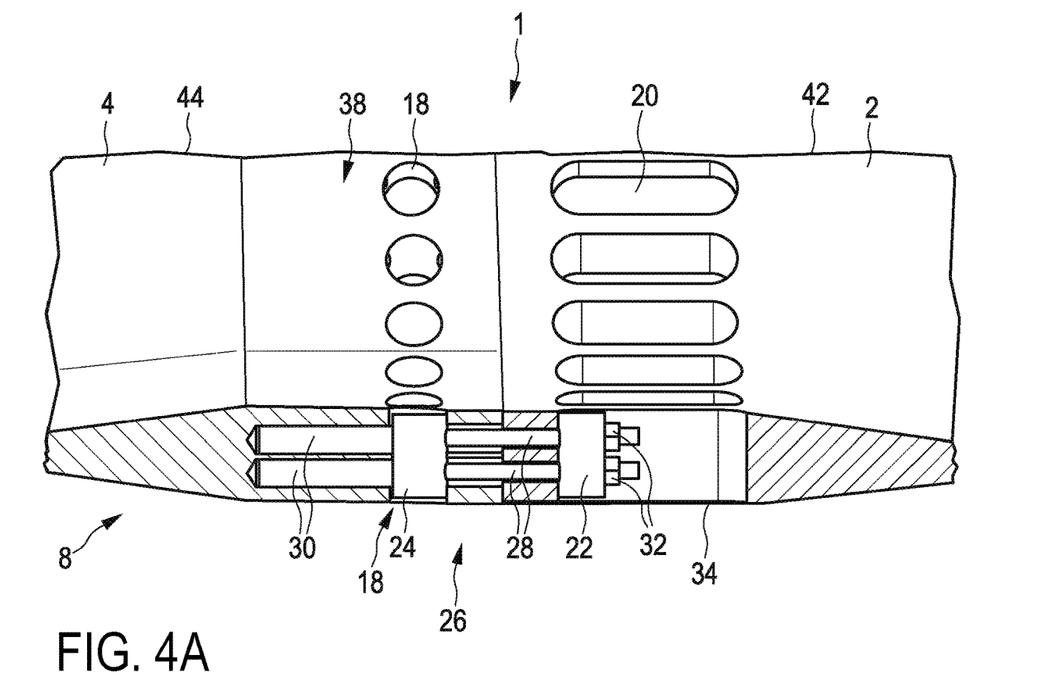
FIG. 4A also shows a portion of a connecting region according to FIG. 2 in a different view.
Figure 4B:
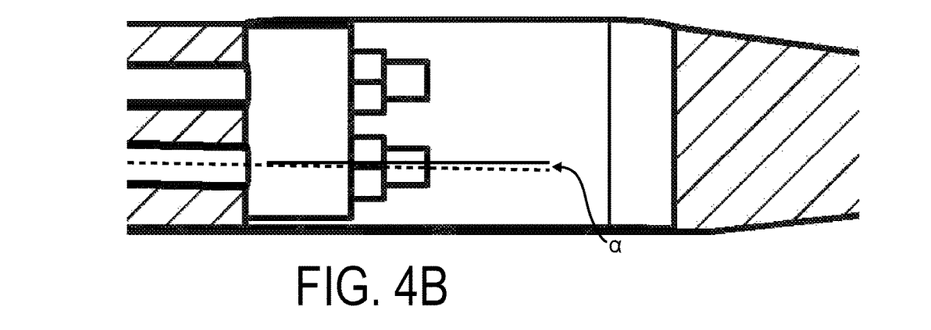
FIG. 4B shows an enlarged portion of the connecting region of FIG. 4A.

FIGS. 3, 4A, and 4B show details of the connection, in particular for example a fastening pair 26 with an inner anchoring pin 22, which is arranged in a bore 18, and an outer anchoring pin 24, which is arranged in an elongated opening 20. The illustrative view in FIGS. 3, 4A, and 4B show further bores 18 and elongated openings 20 in the portion but without further fastening pairs 26, but this only serves for illustrative purposes. In an assembled rotor blade 1, all the bores 18 and elongated openings 20 are preferably equipped with fastening pairs 26.

The fastening pair 26 shown additionally has two threaded rods 28 which can also be referred to as expansion bolts or expansion threaded bolts. In any case, preferably expandable threaded rods are proposed here which can further assist the function of the expansion sleeves.

Expansion sleeves 30 are correspondingly arranged at one end of the threaded rods 28. Moreover, each threaded rod 28 has a clamping means 32. Clamping now takes place such that the clamping means 32 are drawn onto their threaded rods 28, as a result of which the threaded rod 28, essentially according to the view in FIGS. 3 and 4, pulls the respective expansion sleeve 30 against the outer anchoring bolts 24. The two anchoring pins are consequently pulled towards each other and the respective expansion sleeve 30 is moreover pretensioned.

For this purpose, the inner anchoring pin 22, and with it the clamping means 32, can be reached through the elongated opening 20 and, in the assembled state, the connection can be tightened and hence pretensioning for the clamping sleeves achieved. It is, however, not possible to extract the threaded rods 28. FIG. 3 also shows that the elongated opening 20 is closed to the outside with respect to the outer surface 36 of the rotor blade 1 by a seal 34. The fastening means, in other words in particular elements of the fastening pair, are thus protected against the effects of the weather, at least against rainfall.

FIGS. 3, 4A and 4B also illustrate the thickened portion 8, the outer thickened portion 8 and the inner thickened portion 10 respectively, wherein layers of material are not shown here. It can also be seen that the region of constant thickness 38 of the thickened portions 8 and 10 and the fastening pairs 26 are matched to each other. It can also be seen that both the region of constant thickness 38 and the thickened portion 8 are clearly delimited and have a width which is constant around all or part of their periphery.

During production, a barrier plate or barrier disc 27 can be provided in the connecting region between the rotor blade outer part and rotor blade inner part relative to which the rotor blade longitudinal axis thus extends essentially perpendicularly. This barrier plate or barrier disc is here preferably dimensioned such that it projects above the thickened portion in the manner of a boundary layer fence.

The outer row of the threaded rods has an inclination relative to an outer blade surface. In FIG. 4B, the inclination is shown as angle a, which is between 0.5° and 5°.

Figure 5:
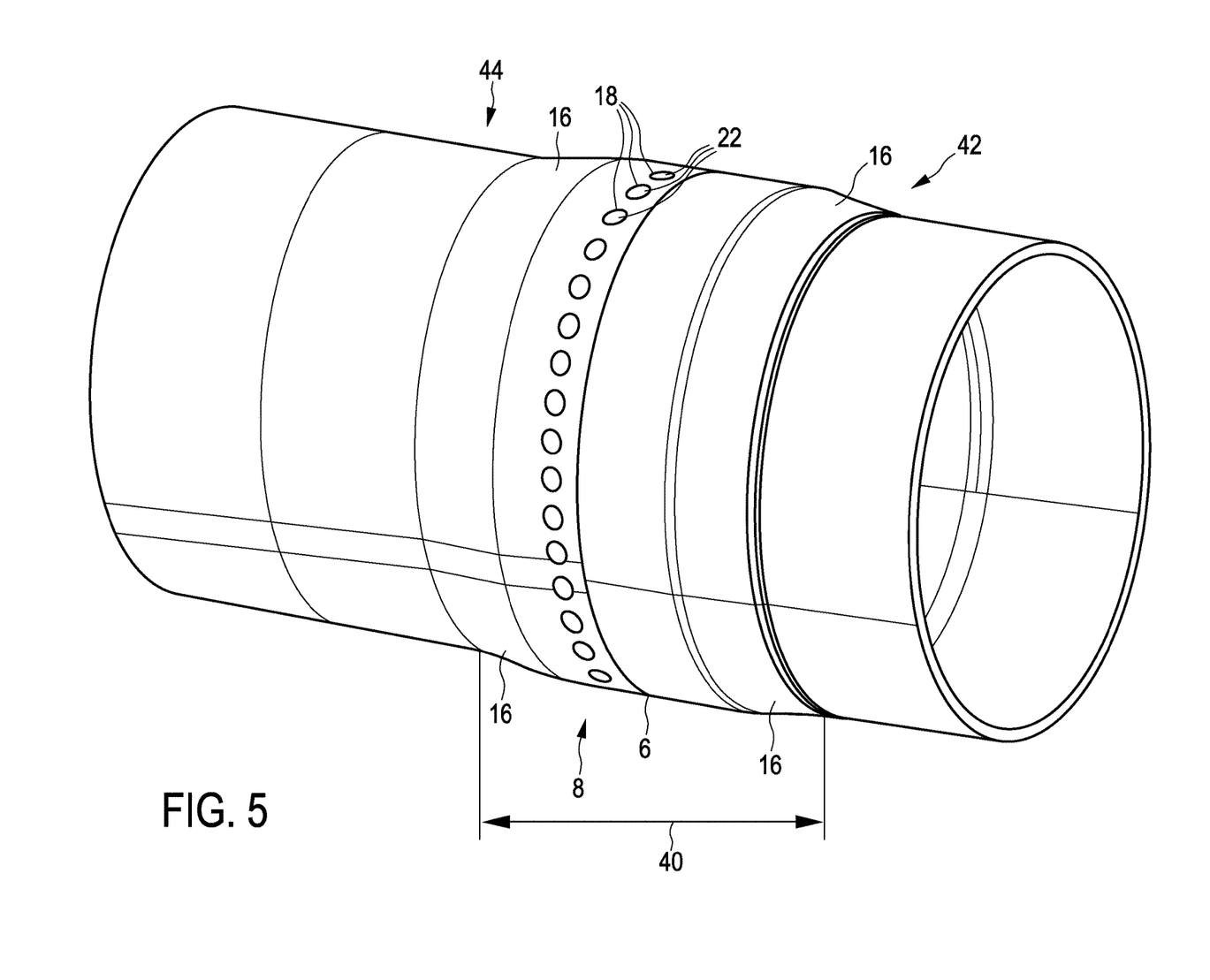
FIG. 5 shows in a perspective view a portion of an inner core assembled with an outer core.

FIG. 5 shows, in a cutaway, an assembled inner core 42 and outer core 44. Parts of these inner and outer cores 42, 44 also directly form the rotor blade surface and hence directly the rotor blade. In this respect, the portions of the rotor blade inner part 2 and the rotor blade outer part 4 in FIGS. 3, 4A and 4B are identical to the inner and outer cores 42, 44.

In this respect, much of what can be seen shown in FIGS. 3 and 4 is also in FIG. 5 but in an external view. In particular the thickened portion 8 can be seen and within it the bores 18 with the inner anchoring pins 22 contained inside. The elongated openings 20 shown in FIGS. 3 and 4 cannot be seen in FIG. 5 because of their cover 34. The cover 34 is fitted into the surface such that it is not shown in FIG. 5. Lastly, the joint 6 can also be seen in FIG. 5, and FIG. 5 also illustrates that the thickened portion 8 forms a peripheral region for these assembled inner and outer cores. The thickened portion 8 here has a constant width 40.

A highly efficient rotor can be obtained with the invention shown. A wind turbine with a nominal output of 3 MW can thus be produced which has a rotor diameter of only 115.7 m. The turbine can, however, be operated with a higher output, for example 3.5 MW.

Figure 6:
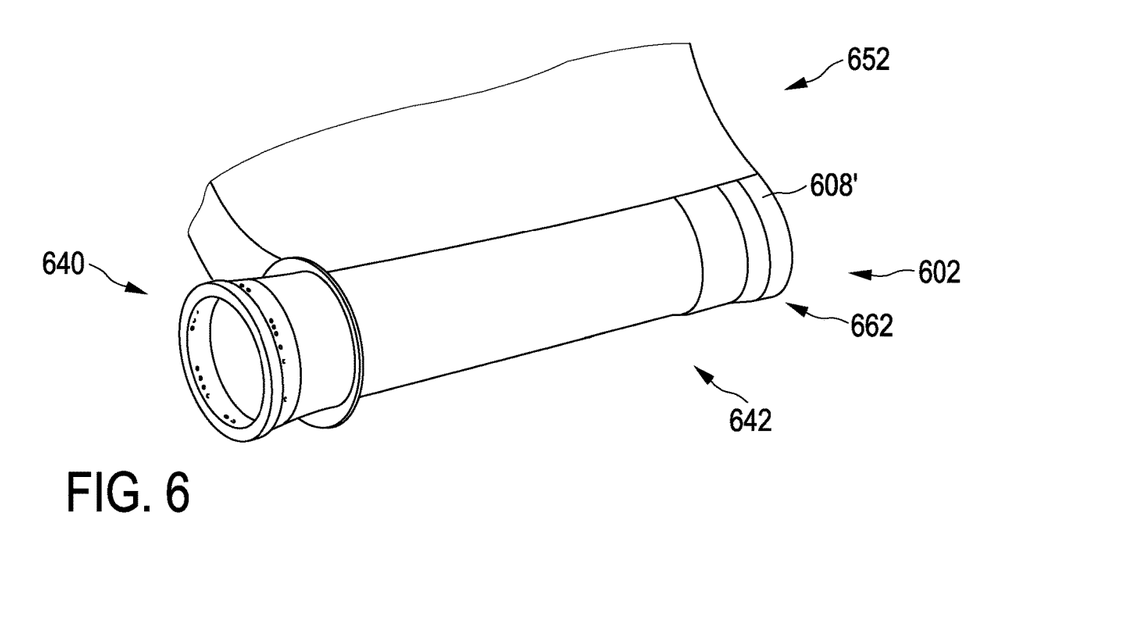
FIG. 6 shows a rotor blade inner part in a perspective view.
Figure 7:
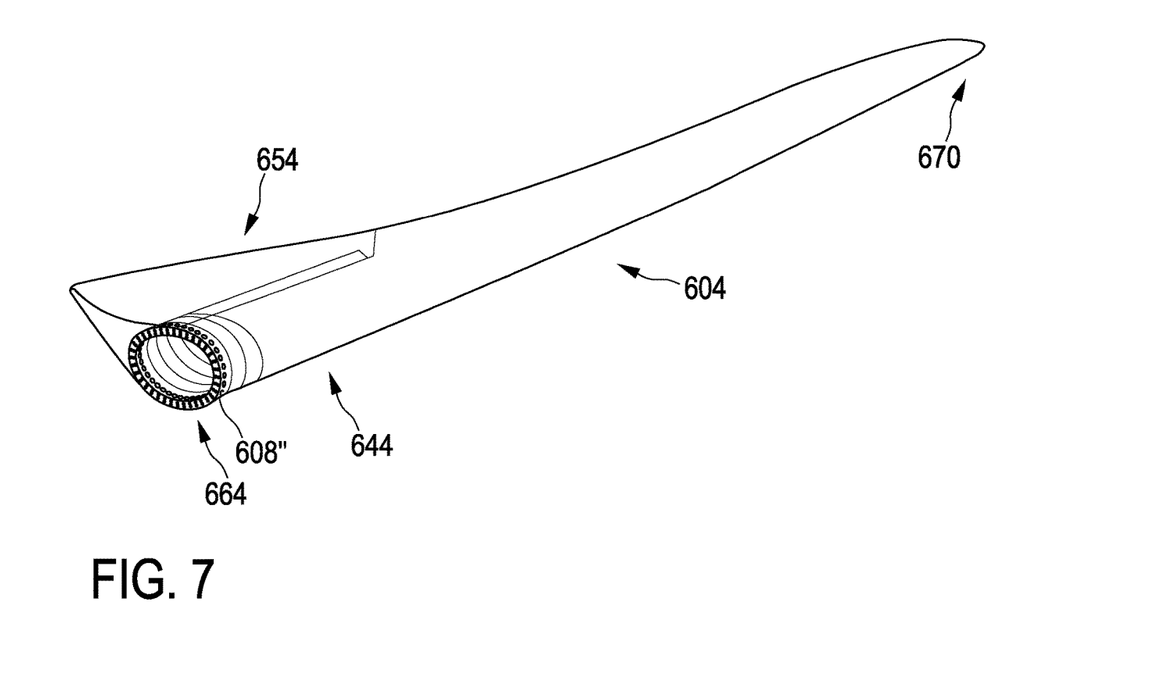
FIG. 7 shows a rotor blade outer part in a perspective view.

The rotor blade inner part 602 in FIG. 6 comprises an inner core 642 and an inner trailing edge box 652. The inner core 642 comprises a root region 640 for fastening to a rotor hub, and an inner fastening region 662 for fastening to an outer fastening region 664 of a rotor blade outer part 604, as shown in FIG. 7. The rotor blade outer part 604 has an outer core 644 on which an outer trailing edge box 654 is arranged and fastened. When the rotor blade inner part 602 has been assembled with the rotor blade outer part 604 according to FIGS. 6 and 7, the inner trailing edge box 652 and the outer trailing edge box 654 are assembled such that they form a functional unit. A possible space or connecting gap between these two elements can optionally be allowed or covered in a simple fashion. The load-bearing fastening of the rotor blade inner part 602 and the rotor blade outer part 604 to each other, and the fastening of the rotor blade outer part 604 to the rotor blade inner part 602 is effected via the inner and outer fastening region 662 and 664.

In the case of the rotor blade outer part 604, the outer core 644 can taper from the outer fastening region 664 to a blade tip 670 and thus provide its oval shape. The outer core 644 and the outer trailing edge box 654 can thus merge into each other. Any explanations about an oval shape of the outer core 644 relate in this respect to the region of the outer fastening region 664, which refers not only to this embodiment but any oval outer core. FIGS. 6 and 7 also show a thickened portion 608' and 608", which together form a common thickened portion when the rotor blade outer part 604 and the rotor blade inner part 602 are assembled.

Figure 8:
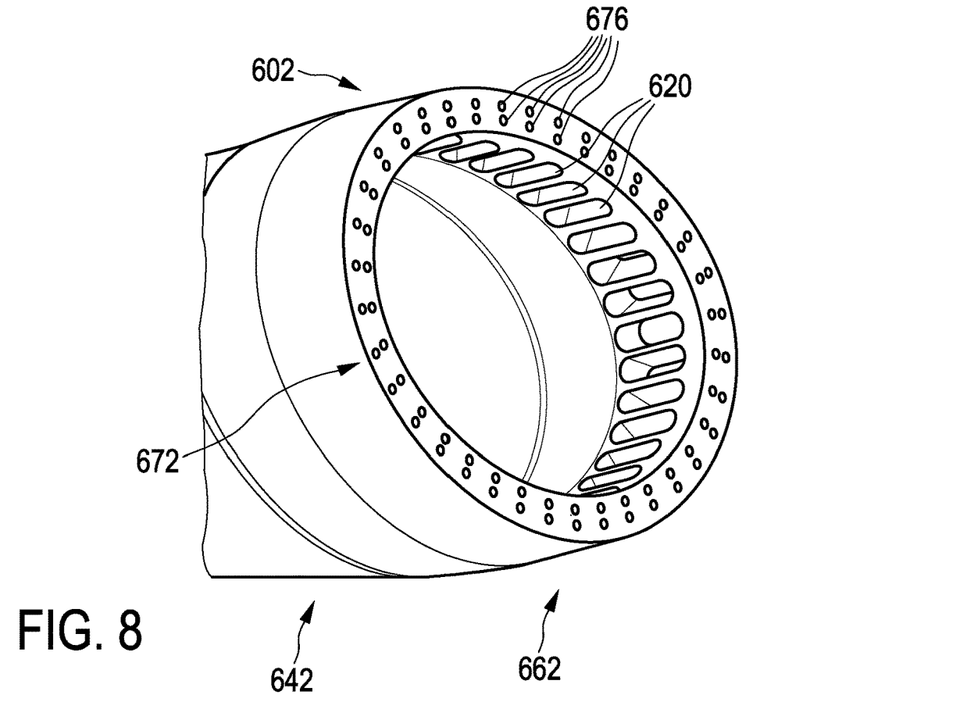
FIG. 8 shows a connecting region of an inner core of a rotor blade inner part in a perspective view.
Figure 9:
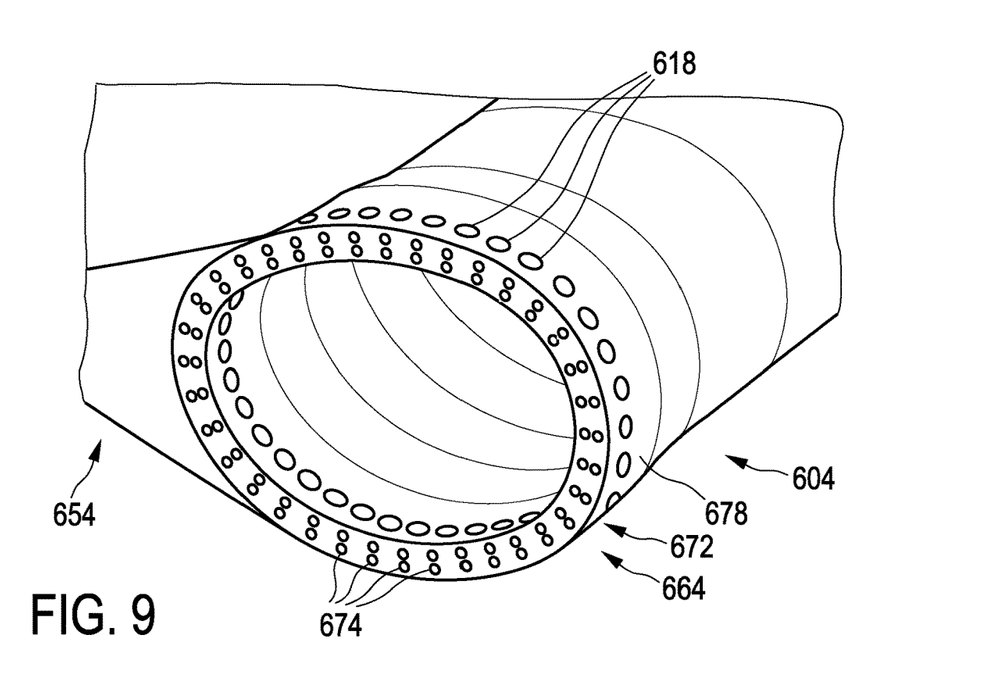
FIG. 9 shows a portion of a rotor blade outer part in a perspective view.

FIGS. 8 and 9 show, enlarged, the inner fastening region 662 and the outer fastening region 664. FIG. 9 shows in rudimentary fashion a further part of the outer trailing edge box 654, wherein the counterpart thereto on the inner core 642 has been omitted for the sake of greater clarity.

It can be seen in FIGS. 8 and 9 that a double-row bolted connection is provided for connecting the two fastening regions 662 and 664. In each case a reference pair of bores 672 is shown in both Figures, i.e., shown for both fastening regions 662 and 664. These two reference pairs of bores then come to be positioned against each other, as intended, when the two fastening regions 662 and 664 are connected.

An outer anchoring pin 24 is inserted into each bore 618 or transverse bore 618 for a connection. A connecting bolt 28, which can also be referred to as a threaded rod, can in each case be pushed through the longitudinal bores 674 as far as the corresponding transverse bore 618 and there through the corresponding outer anchoring pin 24. It can further be inserted through an expansion sleeve and then screwed into a fastening nut or the like, as can be seen essentially in the view in cross-section in FIGS. 3 and 4. Each transverse bore 618 and each outer anchoring pin 24 then comprise a pair of connecting bolts 28. By means of this preparation, the outer fastening region 664 and the inner fastening region 662 can then be placed against each other so that the connecting bolts 28 are pushed into the inner longitudinal bores 676. They can then be screwed, in particular optimally screwed, into the slots 620 shown. As a result, the two blade parts, namely the rotor blade inner part 602 and the rotor blade outer part 604, can then be connected. The connecting bolts which have been thus inserted can then be screwed tight in the slots 620, as is also illustrated essentially in FIGS. 3 and 4.

The slots 620 are closed to the outside and can be accessed only from the blade interior or from the interior of the inner core 642. The transverse bores 618 are each through bores and can be covered from outside by a cover 678 which is illustrated in a rudimentary fashion in FIG. 9.

The invention claimed is:

1. A rotor blade of a wind turbine comprising:
    a blade root including a rotor blade inner part;
    a blade tip including a rotor blade outer part;
    a rotor blade longitudinal axis that extends from the blade root to the blade tip, wherein the rotor blade inner part and the rotor blade outer part are connected to each other in a connecting region and the connecting region forms a thickened portion in the rotor blade; and
    an outer row and an inner row of threaded rods to fasten the rotor blade inner part to the rotor blade outer part, wherein the outer row is arranged proximate an outer surface of the rotor blade and the inner row is arranged proximate an inner surface of the rotor blade,
    wherein a plurality of the outer row of threaded rods have an inclination relative to the outer blade surface, wherein the inclination is between 0.5° and 5°.

2. The rotor blade according to claim 1, wherein the rotor blade inner part and the rotor blade outer part are screwed or bolted to each other in the connecting region.

3. The rotor blade according to claim 1, wherein the thickened portion is designed as a web that extends around a periphery of the rotor blade transverse to the longitudinal axis of the rotor blade.

4. The rotor blade according to claim 1, wherein the thickened portion is raised by at least 1 cm above a surface of the rotor blade, wherein the thickened portion has a thickness that is at least 1% greater than a thickness of remaining portions of the rotor blade.

5. The rotor blade according to claim 1, wherein:
    the rotor blade outer part includes an outer core and an outer trailing edge box,
    the rotor blade inner part includes an inner core and an inner trailing edge box,
    the rotor blade outer part and the rotor blade inner part are assembled in a region of the outer core and inner core,
    the rotor blade outer part and the rotor blade inner part have the thickened portion in the region of the outer and inner core, and
    the thickened portion extends from the outer and inner cores to the outer and inner trailing edge boxes.

6. The rotor blade according to claim 5, wherein at least one of the inner and outer cores is wound and has an oval shape in cross-section.

7. The rotor blade according to claim 5, wherein in the thickened portion, fastening means are enclosed in laminated portions of the rotor blade, wherein at least one of the inner and outer core has an oval shape in cross-section having a ratio of a smallest diameter to a largest diameter of 1:1.2 to 1:2.

8. The rotor blade according to claim 1, comprising fastening means that are enclosed in the rotor blade at the connecting region.

9. The rotor blade according to claim 1, wherein the rotor blade inner part and the rotor blade outer part include fiber-reinforced plastic and the thickened portion includes laminated glass fiber reinforced plastic (GFRP) or carbon fiber reinforced plastice (CFRP).

10. The rotor blade according to claim 1, comprising a blocking plate or blocking disc arranged between the rotor blade inner part and the rotor blade outer part that projects outwards beyond the thickened portion.

11. The rotor blade according to claim 1, wherein:
a first threaded rod of the inner row and a first threaded rod of the outer row that are adjacent to each other together form a pair of threaded rods and is part of a fastening pair, and
the pair of threaded rods in each fastening pair uses a common inner anchoring pin and a common outer anchoring pin, the inner anchoring pin extends transversely relative to the respective pair of threaded rods and is anchored in the rotor blade inner part, and the outer anchoring pin which extends transversely relative to the respective pair of threaded rods and is anchored in the rotor blade outer part,
wherein the pair of threaded rods pulls the inner and the outer anchoring pins towards each other to pull the rotor blade inner part and the rotor blade outer part towards each other.

12. The rotor blade according to claim 11, wherein each fastening pair comprises one of the inner anchoring pins, one of the outer anchoring pins, and one of the pairs of threaded rods, each fastening pair having an expansion sleeve and a clamp, wherein the inner and outer anchoring pins are arranged between the expansion sleeves and the clamp.

13. The rotor blade according to claim 11, wherein one of the inner and outer anchoring pins of each fastening pair is arranged in a bore transverse to the rotor blade longitudinal axis.

14. The rotor blade according to claim 1, wherein at least one of the inner row and the outer row of threaded rods is arranged in a region in the thickened portion.

15. The rotor blade according to claim 1, wherein lengths of the threaded rods prevent removal of the threaded rods in an assembled state due to the thickened portion of the blade inner part forming an opening that is less than the lengths of the threaded rods, wherein the threaded rods have a length of at least 40 cm.

16. A fastening pair for connecting a rotor blade outer part to a rotor blade inner part of a rotor blade of a wind turbine comprising:
a blade root including the rotor blade inner part;
a blade tip including the rotor blade outer part;
a rotor blade longitudinal axis that extends from the blade root to the blade tip, wherein the rotor blade inner part and the rotor blade outer part are connected to each other in a connecting region and the connecting region forms a thickened portion in the rotor blade;
an outer row and an inner row of threaded rods to fasten the rotor blade inner part to the rotor blade outer part, wherein the outer row is arranged proximate an outer surface of the rotor blade and the inner row is arranged proximate an inner surface of the rotor blade,
wherein a plurality of the outer row of threaded rods have an inclination relative to the outer blade surface, wherein the inclination is between 0.50 and 5°;
the fastening pair comprising an inner anchoring pin, an outer anchoring pin, and two threaded rods of the outer row and the inner row of threaded rods, each of the two threaded rods of the outer row and the inner row of threaded rods with an expansion sleeve and a clamping nut, wherein the inner and outer anchoring pins are arranged between the expansion sleeves and the clamping nut.

17. A wind turbine comprising:
a rotor blade hub; and
at least one rotor blade according to claim 1 coupled to the rotor blade hub.

18. A method for producing a rotor blade of a wind turbine, the method comprising:
producing a rotor blade inner part and a rotor blade outer part that includes a connecting region with a thickened portion when the rotor blade inner part is connected to the rotor blade outer part,
connecting the rotor blade inner part to the rotor blade outer part at an erection site of the wind turbine; and
connecting the rotor blade inner part to the rotor blade outer part by an outer row and an inner row of threaded rods, wherein the outer row is arranged proximate an outer surface of the rotor blade and the inner row is arranged proximate an inner surface of the rotor blade,
wherein at least the outer row of threaded rods have an inclination relative to the outer blade surface, wherein the inclination is between 0.5° and 5°.

19. The method according to claim 18, wherein connecting the rotor blade inner part to the rotor blade outer part comprises using threaded rods to connect the rotor blade inner part to the rotor blade outer part.

20. A rotor blade of a wind turbine comprising:
a blade root configured to fasten to a rotor hub, the blade root including a rotor blade inner part having an inner core;
a blade tip that is averted from the rotor hub, the blade tip including a rotor blade outer part having an outer core; and
fastening means that couple the rotor blade inner part and the rotor blade outer part together in a connection region, wherein the connection region forms a thickened portion of the rotor blade,
wherein the fastening means are laminated in the rotor blade,
wherein at least one of the inner and outer cores is wound and has an oval shape in cross-section,
wherein the fastening means are formed as at least one row of threaded rods along the connection region, wherein the at least one row of threaded rods have an inclination relative to an outer blade surface, wherein the inclination is between 0.50 and 5°.

* * * * *